United States Patent
Kim et al.

(10) Patent No.: US 10,727,720 B2
(45) Date of Patent: Jul. 28, 2020

(54) MOTOR

(71) Applicant: LG Innotek Co., Ltd., Seoul (KR)

(72) Inventors: Seong Jin Kim, Seoul (KR); Chang Hyun Park, Seoul (KR); Kyung Sang Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 379 days.

(21) Appl. No.: 15/541,982

(22) PCT Filed: Jan. 6, 2016

(86) PCT No.: PCT/KR2016/000090
§ 371 (c)(1),
(2) Date: Jul. 6, 2017

(87) PCT Pub. No.: WO2016/111539
PCT Pub. Date: Jul. 14, 2016

(65) Prior Publication Data
US 2017/0373563 A1    Dec. 28, 2017

(30) Foreign Application Priority Data

Jan. 7, 2015    (KR) .......................... 10-2015-0002057

(51) Int. Cl.
*H02K 11/00* (2016.01)
*H02K 3/52* (2006.01)
(Continued)

(52) U.S. Cl.
CPC ......... *H02K 11/0094* (2013.01); *H02K 3/522* (2013.01); *H02K 5/22* (2013.01);
(Continued)

(58) Field of Classification Search
CPC .................................................. H02K 3/522
(Continued)

(56) References Cited

U.S. PATENT DOCUMENTS 8,729,755 B2 * 5/2014 Nakagawa ............. H02K 3/522
                                                         310/68 R
9,847,690 B2 * 12/2017 Park ..................... H02K 1/2733
(Continued)

FOREIGN PATENT DOCUMENTS

DE   10 2013 003 024 A1    8/2014
JP        2007-043845 A    2/2007
(Continued)

OTHER PUBLICATIONS

Supplementary European Search Report dated Jul. 6, 2018 in European Application No. 16735160.0.
(Continued)

*Primary Examiner* — Alexander Talpalatski
(74) *Attorney, Agent, or Firm* — Saliwanchik, Lloyd & Eisenschenk

(57) ABSTRACT

The present invention provides a motor that comprises: a housing: a stator that is included in the housing and around which a coil is wound; a rotor coupled to the inside of the stator; a shaft coupled to the rotor; and a bus bar-terminal assembly that includes a bus bar that includes a connection terminal connected with the coil and a terminal connected with an external power supply and a body that includes the bus bar therein such that the connection terminal and the terminal protrude to the outside, wherein the bus bar-terminal assembly includes an alignment guide part provided on the outer circumferential surface of the body in the height direction and slide-coupled with the inner circumferential surface of the housing. Therefore, the present invention provides an advantageous effect of increasing the assembly efficiency of the motor and reducing the number of components thereof by configuring the terminal of the bus bar and the terminal-housing assembly as a single component and an advantageous effect of easily securing the alignment position by providing the alignment guide part on
(Continued)

the outer circumferential surface of the bus bar-terminal assembly and installing a slot or rib at the inside of the housing to correspond to the alignment guide part.

11 Claims, 10 Drawing Sheets

(51) Int. Cl.
 *H02K 5/22* (2006.01)
 *H02K 7/116* (2006.01)
 *H02K 5/06* (2006.01)

(52) U.S. Cl.
 CPC ............. *H02K 7/1166* (2013.01); *H02K 5/06* (2013.01); *H02K 5/225* (2013.01); *H02K 2203/09* (2013.01)

(58) Field of Classification Search
 USPC .......................................................... 310/71
 See application file for complete search history.

(56) References Cited

U.S. PATENT DOCUMENTS

| | | | |
|---|---|---|---|
| 10,008,900 B2 * | 6/2018 | Bessho | H02K 5/225 |
| 2007/0069841 A1 | 3/2007 | Kusano | |
| 2014/0239778 A1 | 8/2014 | Krause et al. | |
| 2015/0188376 A1 * | 7/2015 | Yamaguchi | H02K 3/522 |
| | | | 310/71 |
| 2016/0111929 A1 | 4/2016 | Kessler et al. | |

FOREIGN PATENT DOCUMENTS

| | | |
|---|---|---|
| JP | 2007-318885 A | 12/2007 |
| JP | 2008-024171 A | 2/2008 |
| JP | 2009-124926 A | 6/2009 |
| KR | 10-2013-0017227 A | 2/2013 |
| WO | WO-2012/090679 A1 | 7/2012 |
| WO | WO-2014/174666 A1 | 10/2014 |

OTHER PUBLICATIONS

International Search Report in International Application No. PCT/KR2016/000090, filed Jan. 6, 2016.

* cited by examiner

MOTOR

CROSS-REFERENCE TO RELATED APPLICATIONS

This application is the U.S. national stage application of International Patent Application No. PCT/KR2016/000090, filed Jan. 6, 2016, which claims priority to Korean Application No. 10-2015-0002057, filed Jan. 7, 2015, the disclosures of each of which are incorporated herein by reference in their entirety.

TECHNICAL FIELD

The present invention relates to a motor and, more specifically, to a motor in which a terminal-housing assembly is integrally formed with a bus bar.

BACKGROUND ART

A motor is a device which converts electrical energy into rotational energy using force applied to a conductor in a magnetic field. A conventional motor includes a shaft rotatably formed, a rotor coupled to the shaft, and stators fixed to the housing. The stators are installed along a circumference of the rotor at regular intervals, and coils forming rotating magnetic fields are wound around the stators.

In the case of a split core-type stator, a circular bus bar is provided on stators. Coils of the stators are electrically connected to the bus bar via coil terminals. The bus bar includes bus bar terminals connected to power supplies with different polarities.

The bus bar terminals are connected to a power terminal for connection with a power cable, and the power terminal is provided on a terminal-housing assembly covering a housing of a motor. The terminal-housing assembly includes a terminal hole in which the power terminal is mounted. Conventionally, the power terminal is installed to be fixed in the terminal hole.

When the terminals of the bus bar are assembled to the terminal-housing assembly, it is difficult for the terminals of the bus bar to be aligned and assembled. Also, when the terminal-housing assembly is not positioned at the right place or the power terminal of the terminal-housing assembly is inclined or biased to one side after aligning and assembling, there is a problem in which the terminals of the bus bar may be damaged.

DISCLOSURE

Technical Problem

The present invention is directed to providing a motor which has an improved assembling performance and an alignment position with a housing assembly including a terminal of a bus bar and a power terminal.

Objectives of the present invention are not limited to the above-mentioned objects, and other objectives that are not mentioned may be clearly understood by those skilled in the art to which the present invention pertains from the following description.

Technical Solution

One aspect of the present invention provides a motor which includes a housing, a stator included in the housing and having a coil wound therearound, a rotor coupled to an inner side of the stator, a shaft coupled to the rotor, and a bus bar-terminal assembly which includes a bus bar including a connection terminal connected to the coil and a terminal connected to an external power supply and a body including the bus bar such that the connection terminal and the terminal protrude to the outside, wherein the bus bar-terminal assembly includes an alignment guide part formed at an outer circumferential surface of the body to be slide-coupled to an inner circumferential surface of the housing in a height direction.

The alignment guide part may be formed as a slot formed to be concave in the outer circumferential surface of the body in a radial direction, and the housing may include a guide rib convexly protruding on the inner circumferential surface thereof to be inserted into the alignment guide part.

A slot groove may be formed at an outer circumferential surface of the stator in the height direction, and the bus bar-terminal assembly may be disposed on the stator so that the alignment guide part and the slot groove are aligned in a circumferential direction.

Three alignment guide parts may be disposed in the circumferential direction at regular intervals.

The alignment guide part may be formed in a rib form formed to be convex in a radial direction on the outer circumferential surface of the body, and the housing may include a guide slot protruding from the inner surface thereof such that the alignment guide part is fitted therewith.

Three alignment guide parts may be disposed in a circumferential direction at regular intervals.

The connection terminal and the terminal may be exposed at an upper surface of the body.

The body may include a terminal housing disposed to extend from the upper surface thereof and having the terminal inserted thereinto.

The body may include a coil hole through which a connection end of the coil passes.

The coil hole may be disposed to be adjacent to the connection terminal exposed at the body.

The coil hole may be formed to penetrate from a lower surface of the body to the upper surface thereof.

The motor may include a cover surface at least partially covering an upper surface of the body.

The cover surface may include a terminal slot through which the exposed terminal passes.

Advantageous Effects

The motor according to an exemplary embodiment of the present invention can increase assembling performance of a motor and reduce the number of components by including a bus bar-terminal assembly in which a body, which includes a bus bar formed therein such that a connection terminal and a terminal of the bus bar are exposed to the outside, is integrally formed with the bus bar to form the terminal of the bus bar and the terminal-housing assembly as a single component.

Further, the motor can easily ensure an alignment position by including an alignment guide part provided on an outer circumferential surface of the bus bar-terminal assembly and a slot or a rib formed on an inner side of the housing to correspond to the alignment guide part.

MODES OF THE INVENTION

Hereinafter, exemplary embodiments of the present invention will be described in detail with reference to the accompanying drawings. Purposes, specific advantages, and novel features of the invention will be made clear from exemplary embodiments and the following detailed descriptions in conjunction with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the description of the invention, detailed descriptions of related well-known functions that unnecessarily obscure the gist of the invention will be omitted.

Figure 1:
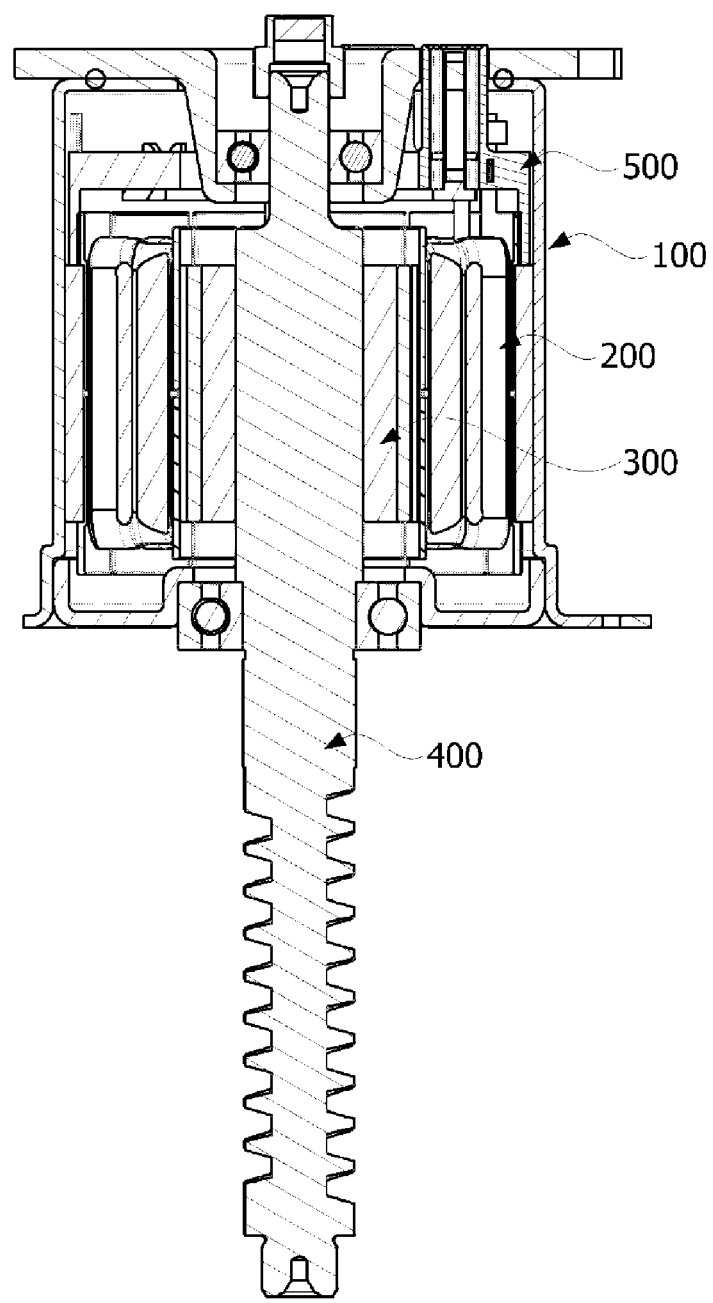
FIG. 1 is a view illustrating a motor according to an exemplary embodiment of the present invention.

FIG. 1 is a view illustrating a motor according to an exemplary embodiment of the present invention.

Referring to FIG. 1, a motor according to an exemplary embodiment of the present invention may include a housing 100, stators 200, a rotor 300, a shaft 400, and a bus bar-terminal assembly 500.

The housing 100 has a cylindrical shape and has a space in which the stators 200 and the rotor 300 are mounted. In this case, a shape or material of the housing 100 may be variously changed, but a metal material which is resistant to high temperature may be selected because the housing 100 is mounted in a vehicle. The housing 100 may be configured to shield the stators 200 and the rotor 300 from the outside.

The stators 200 are separately disposed on an inner circumferential surface of the housing 100 at regular intervals and may form a central space therein.

The rotor 300 may be installed to be rotatable while being accommodated in the central space of the stators 200. The stators 200 may include a plurality of stator cores, and coils forming a rotating magnetic field may be wound around each of the stator cores. The coils wound around the stator cores may be surrounded by an insulator to be insulated. However, the present invention is not limited thereto, and the stators may be formed in a single core form.

When a current is supplied to the coils wound around the stators 200, electrical interaction with the rotor 300 is induced to enable the rotor 300 to rotate. When the rotor 300 rotates, the shaft 400 rotates to provide power.

Figure 2:
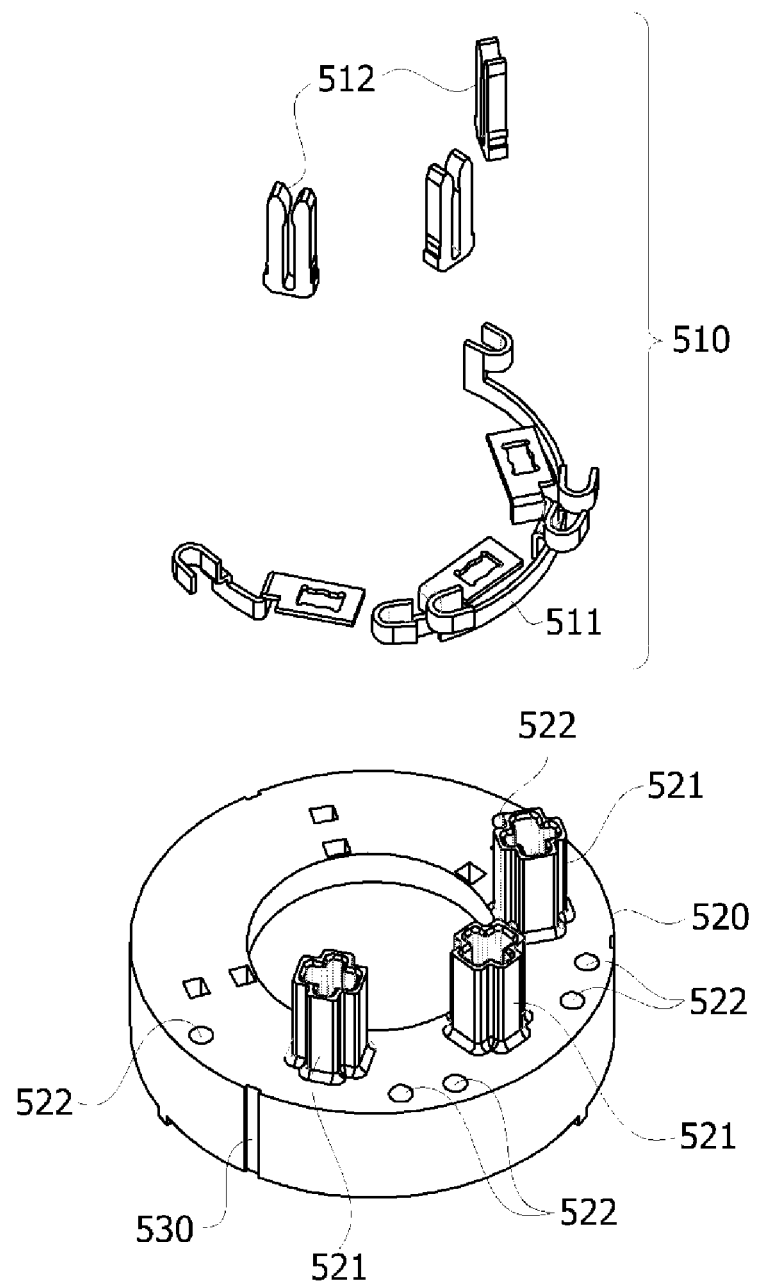
FIG. 2 is a view illustrating a bus bar-terminal assembly of the motor illustrated in the FIG. 1.

FIG. 2 is a view illustrating a bus bar-terminal assembly of the motor illustrated in the FIG. 1. In FIG. 2, only main features are clearly shown for a clear conceptual understanding of the present invention. Accordingly, the present invention may be modified in various forms and may not be limited to the predetermined form illustrated in the drawings.

Referring to FIG. 2, the bus bar-terminal assembly 500 may include a bus bar 510 and a body 520. In this case, the bus bar 510, which includes connection terminals 511 connected to the coils wound around the stators 200 and terminals 512 receiving power, is generally disposed on the stators 200 to connect the coils wound around the stators 200 in parallel.

The connection terminals 511 are fused to the coils wound around the stators 200 and are connected to the coils, and each of the terminals 512 is connected to phases (U, V, and W) of a three-phase power supply.

The bus bar-terminal assembly 500 may be integrally formed in the body 520 by the connection terminals 511 and the terminals 512 which are insert-injected being included in the body 520.

Figure 3:
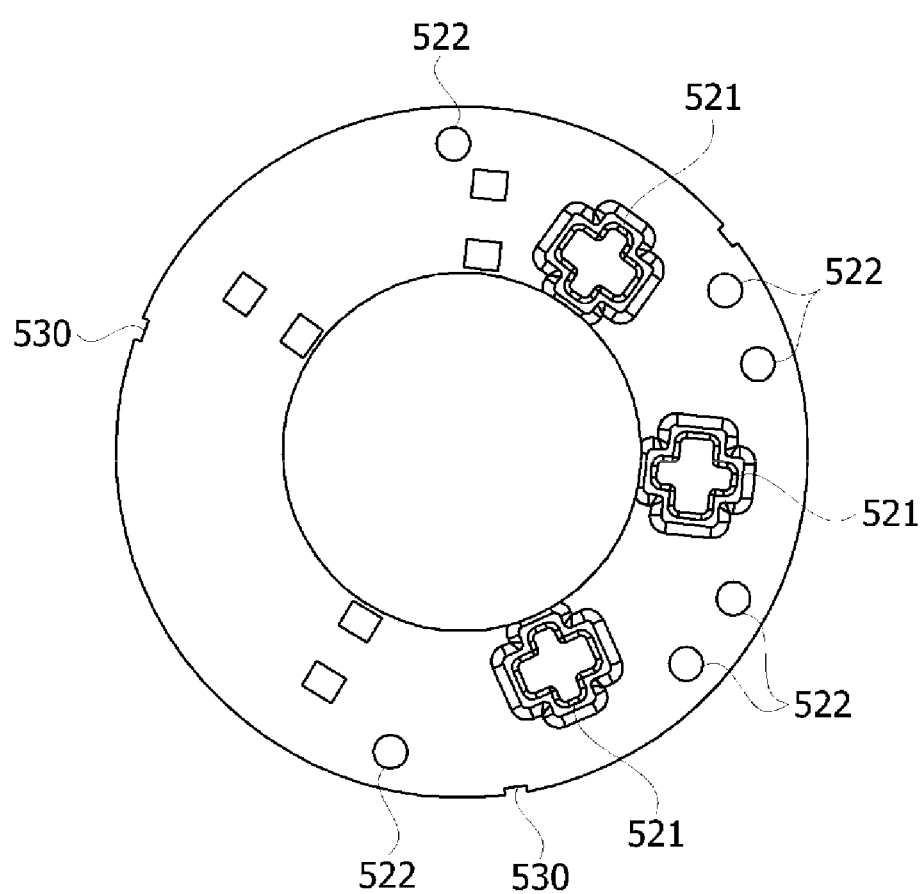
FIG. 3 is a view illustrating a body of the bus bar-terminal assembly.
Figure 4:
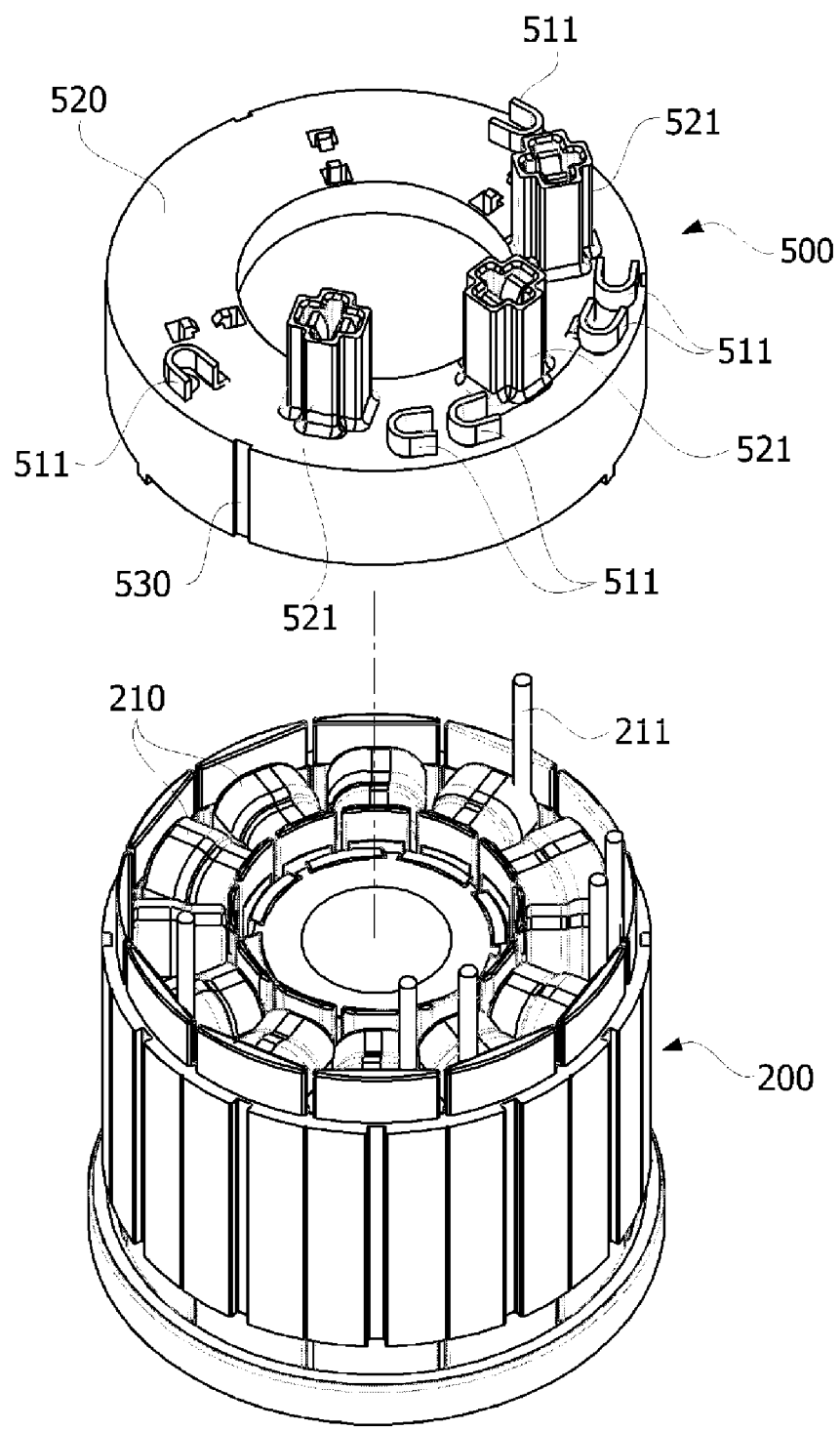
FIG. 4 is a view illustrating the bus bar-terminal assembly to be disposed on a stator.

FIG. 3 is a view illustrating a body of the bus bar-terminal assembly, and FIG. 4 is a view illustrating the bus bar-terminal assembly to be disposed on a stator.

Referring to FIGS. 3 and 4, the connection terminals 511 and the terminals 512 are insert-injected and integrally formed in the body 520, and in this case, fusing units of the connection terminals 511 and connection terminals of the terminals 512 protrude from an upper surface of the body 520 to be exposed. Therefore, coils 210 wound around the stators 200 are fused to the connection terminals 511 and connect the power cable to the terminals 512.

The body 520 may be formed as a donut-shaped cylindrical body which has an empty center. The fusing units of the connection terminals 511 and the connection terminals of the terminals 512 are disposed on the upper surface of the body 520 to be exposed. The body 520 may have coil grooves 522 formed therein. The coil grooves 522 are formed to penetrate from a lower surface of the body 520 to the upper surface thereof and connection ends 211 of the coils 210 are inserted into the coil grooves 522. The coil grooves 522 may be disposed to be adjacent to the connection terminals 511.

The connection end 211 of the coil 210 passing through the coil groove 522 may be directly fused and connected to the connection terminal 511 exposed at the upper surface of the body 520. Six coil grooves 522 may be provided to correspond to six connection terminals included in three connection terminals 511.

Terminal housings 521 surrounding the terminals 512 may be formed to protrude from the upper surface of the body 520. Three terminal housings 521 may be provided to correspond to the three terminals 512.

Figure 5:
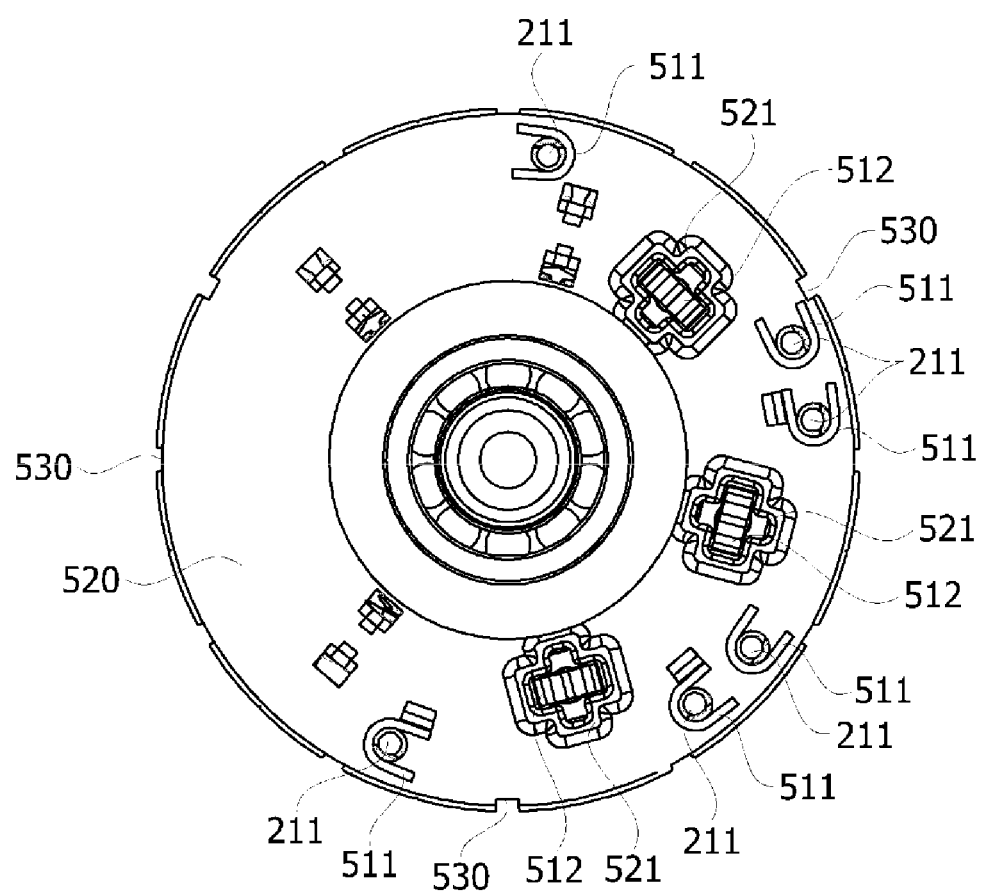
FIG. 5 is a view illustrating the bus bar-terminal assembly mounted on the stator.

FIG. 5 is a view illustrating the bus bar-terminal assembly mounted on the stator.

As shown in FIG. 5, when the connection end 211 of the coil 210 is inserted into the coil groove 522, the coil 210 passing through the coil groove 522 is positioned in a fusing area of the connection terminal 511. Thus, a worker can fit the bus bar-terminal assembly 500 with the coil 210 and then immediately perform a fusing task, and therefore, there is an advantage in that assembling is easy.

To align and insert the connection end 211 of the coil 210 wound around the stator 200 into the coil groove 522 of the body 520 or to align the housing 100 with the terminal 512, a task of aligning the stator 200 and the bus bar-terminal assembly 500 in a circumferential direction is necessary.

To this end, the bus bar-terminal assembly 500 of the motor according to the exemplary embodiment of the present invention includes alignment guide parts 530.

Referring to FIGS. 3 to 5, the alignment guide part 530 is formed to be elongated on an outer circumferential surface of the body 520 in a height direction and are formed to be concave or convex to be slide-coupled with and restrained by the housing 100 with respect to the circumferential direction.

Figure 6:
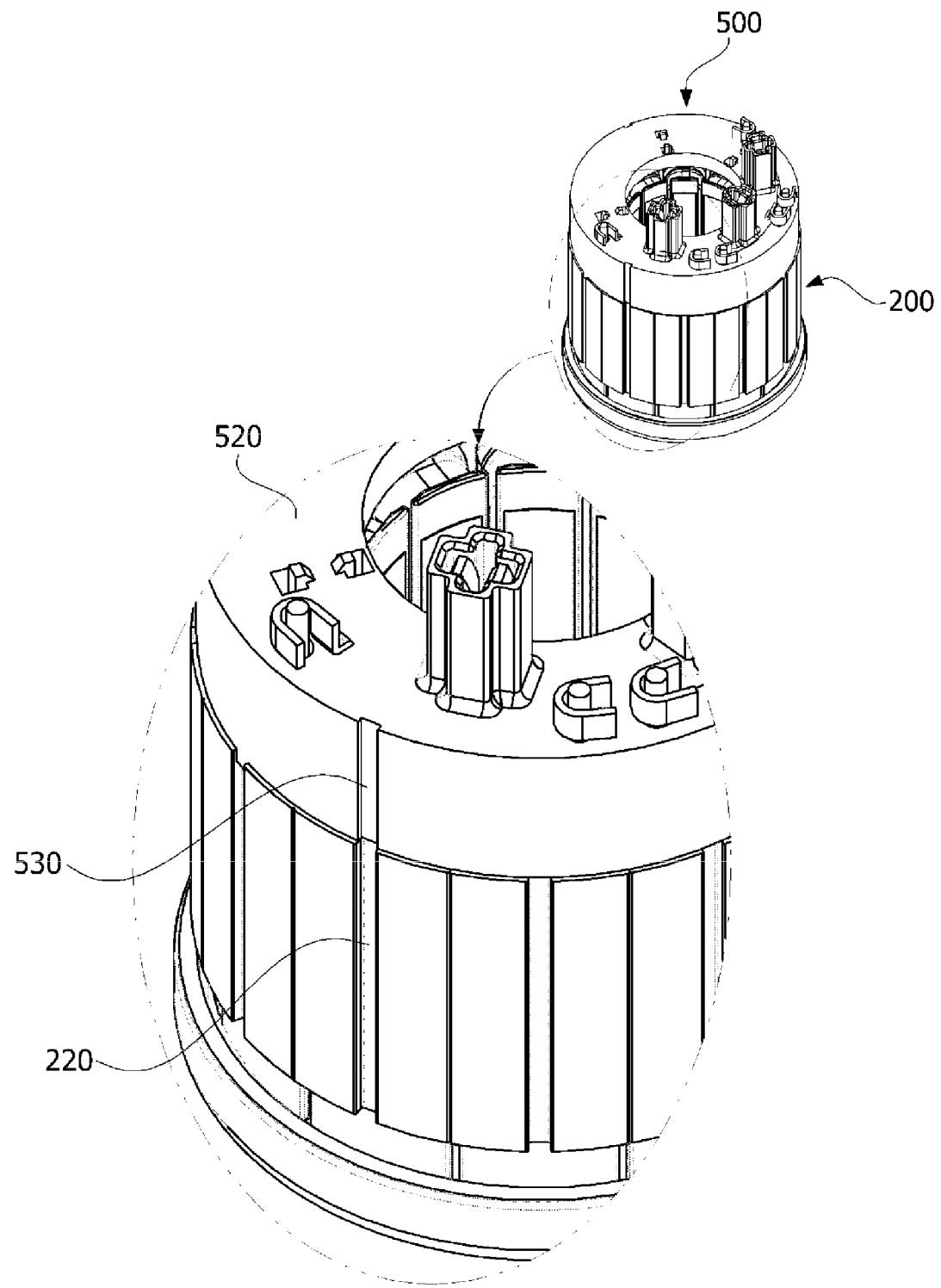
FIG. 6 is a view illustrating a first modified example of an alignment guide part.

FIG. 6 is a view illustrating a first modified example of an alignment guide part.

Referring to FIGS. 3 to 6, the alignment guide part 530 may be formed on the outer circumferential surface of the body 520 in a slot form to be concave in a radial direction. For example, three alignment guide parts 530 may be disposed on an outer circumferential surface of the body 520 at regular intervals.

In this case, slot grooves 220 are formed on an outer circumferential surface of the stators 200, and the alignment guide parts 530 may be disposed to be arranged in the slot grooves 220 in the circumferential direction.

Figure 7:
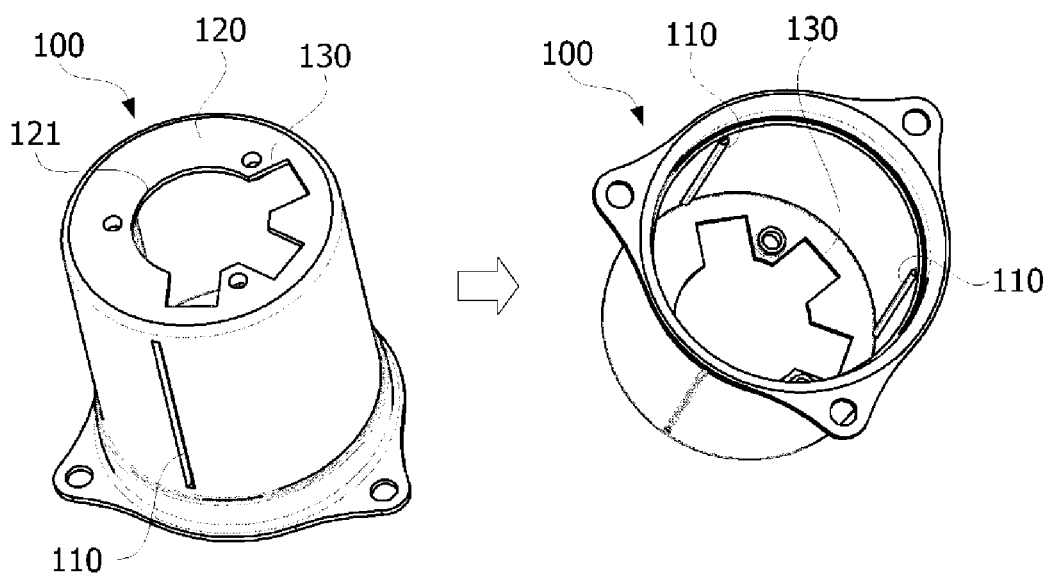
FIG. 7 is a view illustrating a guide rib of a housing.

FIG. 7 is a view illustrating a guide rib of a housing.

Referring to FIG. 7, the housing 100 may include guide ribs 110. The guide rib 110 convexly protrudes from an inner side of the housing 100 in a radial direction to be inserted into the alignment guide part 530. The guide rib 110 is disposed to correspond to a position of the alignment guide part 530. In a process of assembling the bus bar-terminal assembly 500, the guide rib 110 may be formed to be smaller than a width of the alignment guide part 530 so that a foreign material is not generated due to friction with the alignment guide part 530. The alignment guide parts 530 may be designed to be relatively larger than a width of the guide rib 110.

In this case, when coupling the guide rib 110 and the alignment guide part 530, any one of three guide ribs 110 has a size that tightly fits in the alignment guide part 530 when compared to the other two guide ribs 110 to increase an assembling performance with the housing 100.

Meanwhile, the housing 100 may include a cover surface 120 covering an upper surface of the body 520 of the bus bar-terminal assembly 500. The cover surface 120 has a hole 121 in the center thereof so that the shaft 400 passes therethrough, and a terminal slot 130 may be provided around the hole 121. The terminal slot 130 is formed by cutting the cover surface 120 in a radial direction from the hole 121.

Figure 8:
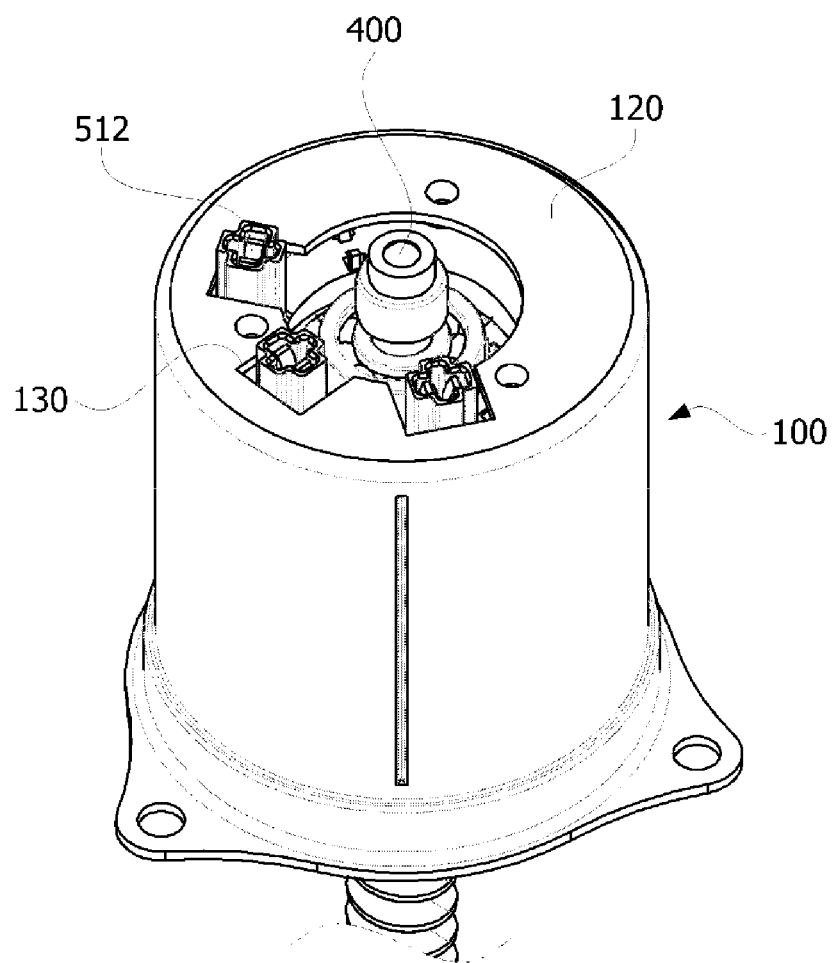
FIG. 8 is a view illustrating a state in which the housing is mounted on the bus bar-terminal assembly.

FIG. 8 is a view illustrating a state in which the housing is mounted on the bus bar-terminal assembly. Referring to FIG. 8, the terminal 512 has to be exposed to the outside of the housing 100 to be connected to an external power cable, and thus the terminal slot 130 ensures a space so that the terminal 512 exposed at the bus bar-terminal assembly 500 can pass therethrough.

Figure 9:
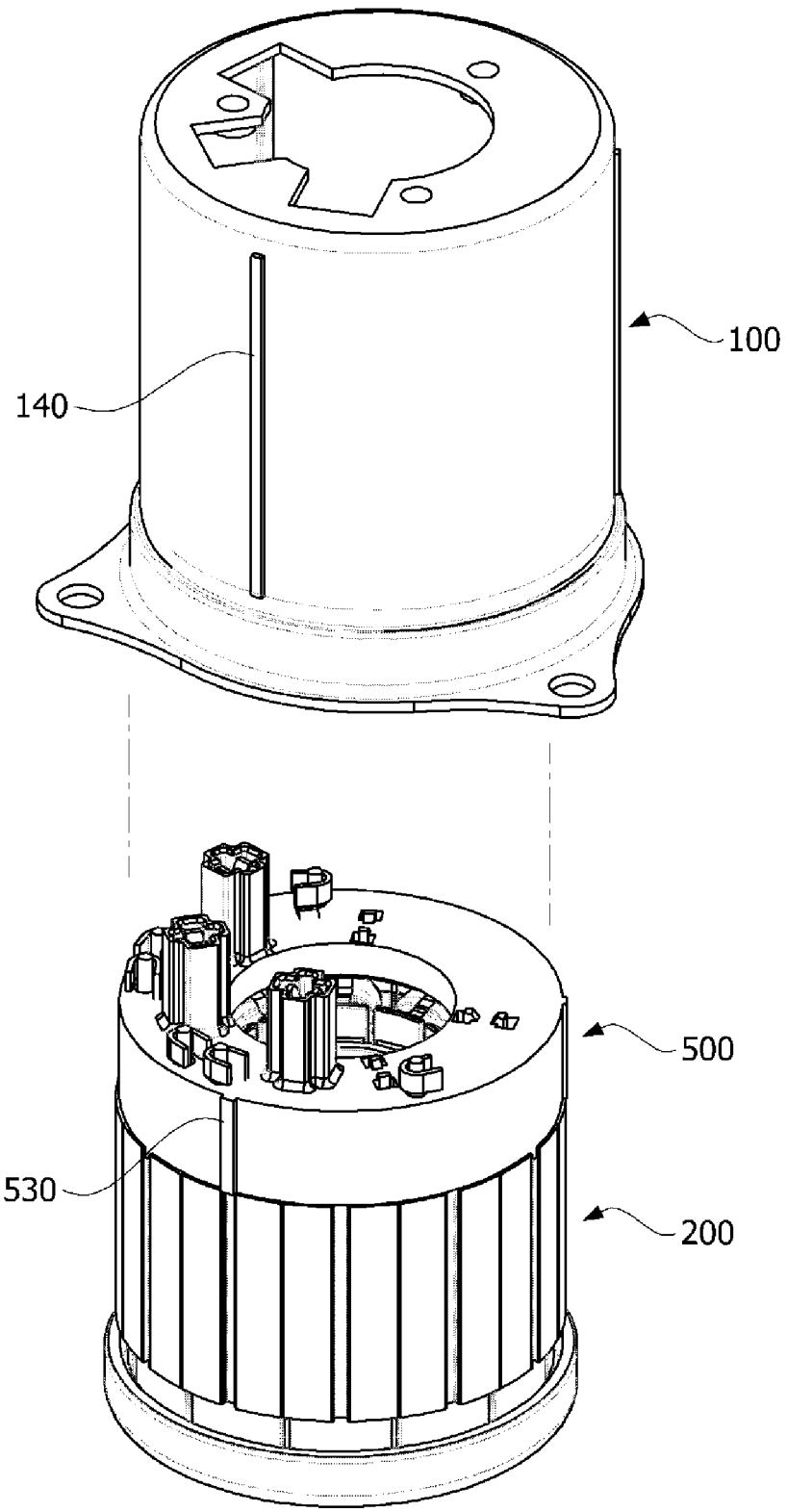
FIG. 9 is a view illustrating a second modified example of the alignment guide part.
Figure 10:
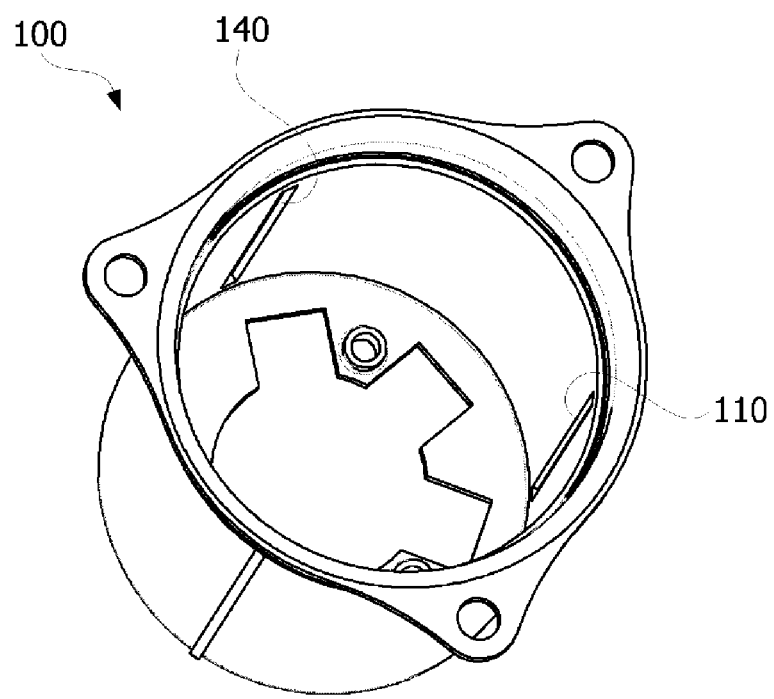
FIG. 10 is a view illustrating a housing including a guide slot.

FIG. 9 is a view illustrating a second modified example of the alignment guide part, and FIG. 10 is a view illustrating a housing including a guide slot.

Referring to FIGS. 9 and 10, the alignment guide part 530 may be formed in a rib form formed to be convex in a radial direction on the outer circumferential surface of the body 520. For example, the three alignment guide parts 530 may be disposed on the outer circumferential surface of the body 520 at regular intervals.

The housing 100 may include guide slots 140. Each of the guide slots 140 protrudes from an inner side of the housing 100 in a radial direction and has the alignment guide part 530 inserted thereinto. The guide slots 140 are disposed to correspond to the positions of the alignment guide parts 530.

The motor according to the exemplary embodiments of the invention has been described in detail with reference to the accompanying drawings.

The above description is only an illustrative description of the technical idea of the present invention, and it should be understood by those of skilled in the art that various changes, modifications, and replacements may be made without departing from the spirit and scope of the present invention. Therefore, the exemplary embodiments and accompanying drawings disclosed in the present invention should be considered in a descriptive sense only and not for purposes of limitation. Accordingly, the scope of the invention is not limited by the embodiments. The scope of the invention is defined not by the detailed description of the invention but by the appended claims, and encompasses all modifications and equivalents that fall within the scope of the appended claims.

DESCRIPTION OF SYMBOLS

100: HOUSING
110: GUIDE RIB
120: COVER SURFACE
121: HOLE
130: TERMINAL SLOT
140: GUIDE SLOT
200: STATOR
210: COIL
211: CONNECTION END
220: SLOT GROOVE
300: ROTOR
400: SHAFT
500: BUS BAR-TERMINAL ASSEMBLY
511: CONNECTION TERMINAL
512: TERMINAL
520: BODY
521: TERMINAL HOUSING
522: COIL GROOVE
530: ALIGNMENT GUIDE PART

The invention claimed is:

1. A motor comprising:
a housing;
a stator disposed in the housing and having a coil wound therearound;
a rotor disposed at an inner side of the stator;
a shaft coupled to the rotor;
a bus bar-terminal assembly disposed at an upper side of the stator,
wherein the bus bar-terminal assembly comprises:
a bus bar including a connection terminal coupled to the coil and a terminal connected to an external power supply; and
a body disposed at the upper side of the stator such that a part of the bus bar is located inside of the body;
wherein a part of the connection terminal and a part of the terminal protrude to an outside of the body,
wherein the body includes an alignment guide part formed at an outer circumferential surface of the body to be slide-coupled to an inner circumferential surface of the housing,
wherein the stator includes a slot groove extending in an axial direction and disposed on an outer circumferential surface of the stator, wherein the housing includes a guide rib extending in the axial direction and protruding from the inner circumferential surface thereof, and wherein the guide rib is disposed in the alignment guide part and the slot groove.

2. The motor of claim 1, wherein the alignment guide part is formed as a slot formed to be concave in the outer circumferential surface of the body in a central direction of the body.

3. The motor of claim 2, wherein the alignment guide part and the slot groove are aligned in a circumferential direction.

4. The motor of claim 1, wherein the alignment guide part comprises three alignment guide parts disposed in a circumferential direction with respect to a center of the body at regular intervals.

5. The motor of claim 1, wherein the connection terminal and the terminal are exposed at an upper surface of the body.

6. The motor of claim 5, wherein the body includes a terminal housing disposed to extend from the upper surface thereof and having the terminal inserted thereinto.

7. The motor of claim 6, wherein the body includes a coil hole through which a connection end of the coil passes.

8. The motor of claim 7, wherein the coil hole is disposed to be adjacent to the connection terminal exposed at the body.

9. The motor of claim 8, wherein the coil hole is formed to penetrate from a lower surface of the body to the upper surface thereof.

10. The motor of claim 6, wherein the housing comprises a cover surface partially covering the upper surface of the body.

11. The motor of claim 10, wherein the cover surface includes a terminal slot through which the terminal housing penetrates.

* * * * *